United States Patent [19]

Kanevsky et al.

[11] Patent Number: 5,774,525

[45] Date of Patent: Jun. 30, 1998

[54] METHOD AND APPARATUS UTILIZING DYNAMIC QUESTIONING TO PROVIDE SECURE ACCESS CONTROL

[75] Inventors: Dimitri Kanevsky, Ossining; Marcel Mordechay Yung, New York; Wlodek Wlodzimierz Zadrozny, Mohegan Lake, all of N.Y.

[73] Assignee: International Business Machines Corporation, Armonk, N.Y.

[21] Appl. No.: 911,259

[22] Filed: Aug. 14, 1997

Related U.S. Application Data

[63] Continuation of Ser. No. 376,579, Jan. 23, 1995, abandoned.

[51] Int. Cl.[6] .................................................. H04M 1/64
[52] U.S. Cl. .............................. 379/88; 379/188; 380/23; 395/2.82
[58] Field of Search ................................. 379/67, 88, 89, 379/201, 188, 196, 197, 198, 199; 395/153, 154, 155, 161, 2.79, 2.82; 380/4, 23, 24, 25

[56] References Cited

U.S. PATENT DOCUMENTS

| | | | |
|---|---|---|---|
| 4,528,442 | 7/1985 | Endo | 235/379 |
| 4,624,008 | 11/1986 | Vensko et al. | 381/43 |
| 4,653,097 | 3/1987 | Watanabe et al. | 381/42 |
| 4,827,518 | 5/1989 | Feustel et al. | 381/42 |
| 4,991,205 | 2/1991 | Lemelson | 379/91 |
| 5,056,141 | 10/1991 | Dyke | 380/25 |
| 5,127,043 | 6/1992 | Hunt et al. | 379/88 |
| 5,136,633 | 8/1992 | Tejada et al. | 379/97 |
| 5,181,238 | 1/1993 | Medamana et al. | 379/97 |
| 5,204,894 | 4/1993 | Darden | 379/88 |
| 5,216,720 | 6/1993 | Naik et al. | 381/43 |
| 5,247,497 | 9/1993 | Cohn | 379/88 |
| 5,311,594 | 5/1994 | Penzias | 380/23 |
| 5,345,549 | 9/1994 | Appel et al. | 395/154 |

OTHER PUBLICATIONS

"Enhanced Security for Voice–Response Systems", IBM Technical Disclosure Bulletin, vol. 36 No. 09B Sep. 1993.

P.S. Jacobs & L.F. Rau, "Innovations in text interpretation" Artificial Intelligence 63 (1993) pp. 143–191, Elsevier Sci. Publishers.

(List continued on next page.)

*Primary Examiner*—Fan S. Tsang
*Attorney, Agent, or Firm*—Jay P. Sbrollini

[57] ABSTRACT

A method and corresponding apparatus utilizes questioning to provide secure access control including the steps of storing information in a database; generating at least one question based upon the information stored in the data base; communicating to the user the generated question(s); receiving a response associated with the question(s), interpreting the response to determine whether the response conforms to the information upon which is based the associated question (s); and outputting an authorization status indicating whether or not the user is authorized for access according to the determination. The question(s) concerns a relationship among portions of information contained in said data base. This feature is advantageous because it protects against an eavesdropper gaining access to the service or facility and provides the capability of generating a relatively large number of different questions from a small data base. Furthermore, the questions asked of the user may be based on dynamic data, which advantageously protects against eavesdroppers gaining access to the service or facility. In addition, the number and/or type of questions generated by the first module may correspond to a security level of the system. The security level may be set by the service or facility, or may be set the system control module according to user input.

16 Claims, 5 Drawing Sheets

OTHER PUBLICATIONS

Zadronsny et al, "NL understanding with a grammar of constructions" Proceedings International Conf. on Computational Linguisitics, Coling '94 Kyoto, JA, Aug. 1994.

Dowdling et al, Gemini:A Natural Language System for Spoken Language Understanding Proc. 31st Ann.Mtg. of Assoc. for Computational Linguisitics pp. 54–61, Jun. 1993.

Graeme Hirst, Semantic Interpretation and the Resolution of Ambiguity pp. i–xiv; 1–15; 25–56, Cambridge Univ. Press, Great Britain, 1987.

G. Gazdar and C. Mellish, Natural Language Processing in Prolog pp.iii–xv; 1–19; 99–177; 279–358; 386–402, Addison–Wesley Pub. Co., GT. Britain, 1989.

B. Grau et al., "Control in man–machine dialogue", pp. 32–55, Think, May 1994, ITK, Tlibur Univ., Tilbur, The Netherlands.

D.D. McDonald et al, Symbolic Computation–Natural Language Generation Systems, pp. i–xi; pp. 312–384, Springer–Verlag, New York, 1988.

R. Dale, Generating Referring Expressions, cover sheet–p. 15; pp. 70–113 The MIT Press, Cambridge, Mass., 1992.

Advances in Natural Language Generation, edited by M. Zock et al, vol.1 pp. i–vii; 1–50; 112–130 Ablex Pub. Corp., Norwood, N.J. 1988.

FIG. 5

| ID # | CATEGORY | PROPERTIES | | | | |
|---|---|---|---|---|---|---|
| 1 | A | $a_{11}$ | $a_{12}$ | $a_{13}$ | • • • | $a_{1n}$ |
| | B | $b_{11}$ | $b_{12}$ | $b_{13}$ | • • • | $b_{1n}$ |
| | C | $c_{11}$ | $c_{12}$ | $c_{13}$ | • • • | $c_{1n}$ |
| ⋮ | | | | | | |
| | ZZ | $zz_{11}$ | $zz_{12}$ | $zz_{13}$ | • • • | $zz_{1n}$ |
| 2 | A | $a_{21}$ | $a_{22}$ | $a_{23}$ | • • • | $a_{2n}$ |
| | B | $b_{21}$ | $b_{22}$ | $b_{23}$ | • • • | $b_{2n}$ |
| | C | $c_{21}$ | $c_{22}$ | $c_{23}$ | • • • | $c_{2n}$ |
| ⋮ | | | | | | |
| | ZZ | $zz_{21}$ | $zz_{22}$ | $zz_{23}$ | • • • | $zz_{2n}$ |
| ⋮ | | | | | | |
| K | A | $a_{k1}$ | $a_{k2}$ | $a_{k3}$ | • • • | $a_{kn}$ |
| | B | $b_{k1}$ | $b_{k2}$ | $b_{k3}$ | • • • | $b_{kn}$ |
| | C | $c_{k1}$ | $c_{k2}$ | $c_{k3}$ | • • • | $c_{kn}$ |
| ⋮ | | | | | | |
| | ZZ | $zz_{k1}$ | $zz_{k2}$ | $zz_{k3}$ | • • • | $zz_{kn}$ |

METHOD AND APPARATUS UTILIZING DYNAMIC QUESTIONING TO PROVIDE SECURE ACCESS CONTROL

This is a continuation of application Ser. No. 08/376,579, filed Jan. 23, 1995, now abandoned.

BACKGROUND OF THE INVENTION

1. Technical Field of the Invention

The invention relates to access control, and, more particularly, to controlling access through questioning.

2. Description of the Prior Art

In many instances, it is necessary to verify that an individual requesting access to a service/facility is in fact authorized to access the service/facility. For example, the service may be a financial institution providing bank and/or credit accounts, a telephone provider, a computer system, a data base system, a home video provider (including pay per view and video on demand providers), an interactive television provider, and a retailer that sells merchandise by phone and/or television and/or over a communication network.

Typically, access is controlled by requiring a individual to provide an identification code such as a password and/or provide a magnetic card carrying coded identification data before the individual is granted access to the service/facility. However, such access control schemes are susceptible to fraud because the identification code and/or magnetic card can easily be compromised.

To provide additional security, it has been proposed to integrate speech verification into the access control scheme, see U.S. Pat. No. 4,653,097 to Watanabe et al., U.S. Pat. No. 5,216,720 to Naik et al., U.S. Pat. No. 5,127,043 to Hunt et al, and U.S. Pat. No. 4,827,518 to Feustel et al. To verify the identity of the speaker, these systems typically request and analyze the speaker's voice pattern in responding to predetermined questions against stored characteristics. However, these systems too may be compromised by recording the individuals response to the predetermined questions or may be lead to errors if, for example, the speaker has a cold. Moreover, these systems are susceptible to fraud because the predetermined questions are based on static data that does not change over time.

Additionally, it has been proposed to integrate speech recognition and synthesis into an access control scheme, see U.S. Pat. No. 4,528,442 to Endo. During enrollment such systems record the answers of the individual to predetermined questions, and during verification request that the user answer one or more of the predetermined answers and attempts to match the answer given by the user to the recorded answer. Similarly, U.S. Pat. No. 5,056,141 to Dyke discloses a system that requests the user to repeat prerecorded prompt/response pairs. These systems are also susceptible to fraud because the answer to the predetermined questions may be compromised. Moreover, these systems are susceptible to fraud because the predetermined questions are based on static data that does not change over time.

Accordingly, it is an object of the present invention to provide a system that offers improved security in controlling access to a service or facility.

It is an additional object to provide an improved secure access control system that utilizes a relatively small database.

Additional objects and advantages of the invention will become apparent in light of the description which follows, and in part will be obvious from the description, or may be learned by practice of the invention.

SUMMARY OF THE INVENTION

To achieve the objects in accordance with the purposes of the present invention, as embodied and described herein, a method and apparatus utilizing dynamic questioning to provide secure access control. The apparatus and corresponding method that controls access to a service or facility according to answers provided by a user in response to questions asked of the user comprises: a data base storing dynamic data; a first module that generates at least one question based upon the dynamic data stored in the data base; means for communicating to the user the question(s) generated by the first module; means for receiving a response associated with the question(s), a second module that interprets the response to determine whether the response conforms to the dynamic data upon which is based the associated question(s); and a system control module that outputs an authorization status indicating whether or not the user is authorized for access according to the determination made by said second module.

Because the questions asked of the user are based on dynamic data, the system advantageously protects against eavesdroppers gaining access to the service or facility.

Furthermore, the first module may be controlled to generate questions such that a minimum amount of information contained in the dynamic data base is disclosed to the user. This feature is advantageous because it protects against an eavesdropper gaining access to the service or facility and provides the capability of generating a relatively large number of different questions from a small data base.

In addition, the number and/or type of questions generated by the first module may correspond to a security level of the system. The security level may be set by the service or facility, or may be set the system control module according to user input.

BRIEF DESCRIPTION OF THE DRAWINGS

FIG. 5 illustrates an arrangement of information in the static and/or dynamic data base of FIG. 3.

DETAILED DESCRIPTION OF THE PREFERRED EMBODIMENTS

For simplification, the embodiment described below characterizes the access control system of the present invention in a service provider network. However, the invention is not limited in this respect and can be used in any application requiring secure access control, such as secure facilities.

Figure 1:
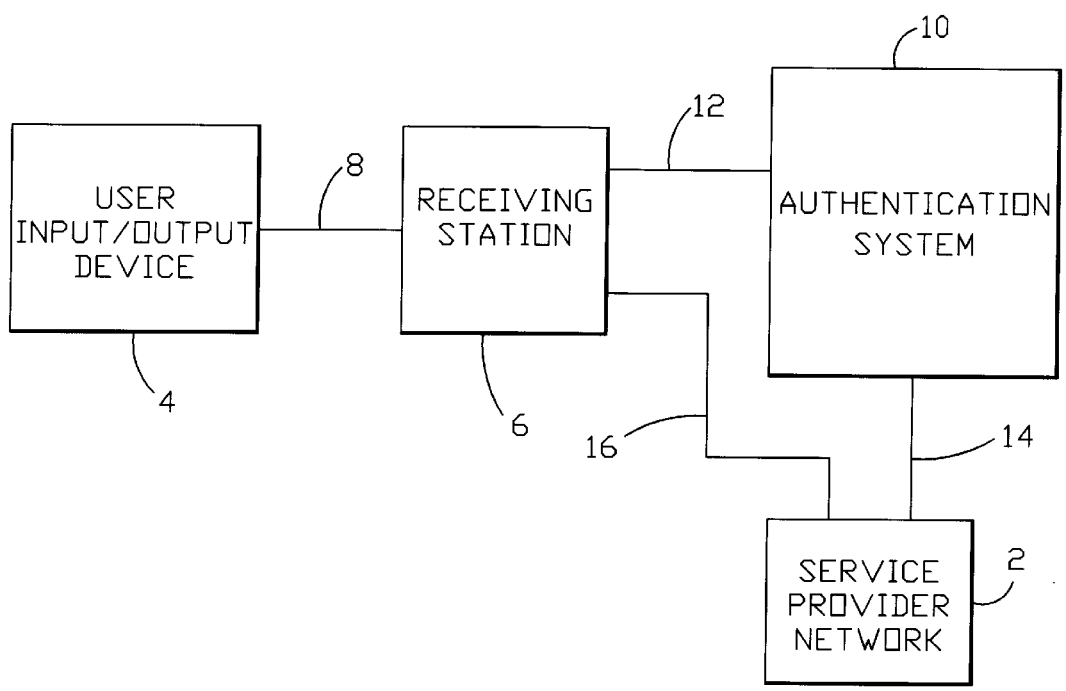
FIG. 1 is a functional block diagram of the secure access control system of the present invention in a service provide network.

With reference to FIG. 1, a system to control access to one or more service provider networks 2 (one shown) includes a plurality of user input/output devices 4 (one shown) each coupled to a receiving station 6 via a communication link 8. Each user input/output device 4 gathers input data that represents a user requested transaction over one of the service provider networks 2 and communicates the input data to the receiving station 6 via the communication link 8. The receiving station 6 receives the input data and forwards the input data to an authentication system 10 over a communication link 12. The authentication system 10 determines the authorization status of the user, i.e. is the user an individual authorized to access the requested service provider network 2. Upon determining that the user is an authorized individual, the authentication system 10 forwards the input data to the requested service provider network 2 via communication links 14 for processing the transaction. Upon determining that the user is not an authorized individual, the authentication system 10 may forward data indicating such to the requested service provider network 2 over communication link 14.

Alternatively, the receiving station 6 may route the input data to the authentication system 10 and the requested service provider network 2 via communication links 12,16, respectively. The authorization status is output by the authentication system 12 to the requested service provider network 2 over communication link 14. The authorization status output by the authentication system 10 may be forwarded to the requested service provider network 2 prior to the requested service provider network 2 granting access to the user and/or during the period of access by the user.

In determining the authorization status of the user, the authentication system 10 generates output data to be communicated to the user. For example, the output data may represent questions to be answered by the user. The output data generated by the authentication system 10 is forwarded to the receiving station 6 via communication link 12. The receiving station 6 receives and forwards the output data to the input/output device 4 via communication link 8.

The requested service provider network 2 may also generate output data to be communicated to the user. For, example, in the case that the service provider network 2 is a financial ATM network, the output data may represent an indication that the transaction has been successfully completed or represent a control signal to the user input/output device 4 (ATM machine) to supply the user with the requested amount of cash. The output data generated by the requested service provider network 2 may be forwarded to the receiving station 6 directly via communication link 16 or indirectly through the authentication system 10 via communication links 14 and 12. The receiving station 6 receives and forwards the output data to the user input/output device 4 via communication link 8.

The user input/output device 4 may include a telephone for communicating voice data, a computer system for communicating character data, a handwriting tablet for inputting handwritten user data, a speaker for outputting voice data or other devices that communicate questions to the user in response to the output data and gathers input data representing replies to those questions. The user input/output device 4 may also include additional tools to identify characteristics of the user. The additional tools may include, for example, a magnetic card reader or a fingerprint reader.

In the case that any two of the service provider network 2, user input/output device 4, receiving station 6 and authentication system 10 are remote from one another, the corresponding communication links 8,12,14,16 may utilize a modem over a telephone network, a direct data link over cable, an RF link, a microwave link or other suitable data communication techniques. In the case that two or more of the service provider network 2, user input/output device 4, receiving station 6 and authentication system 10 are integrated into a common processing system, the corresponding communication links 8,12,14,16 may be data paths of the processing system. The input data, output data and authorization status may be communicated over the communication links in analog or digital form.

Figure 2:
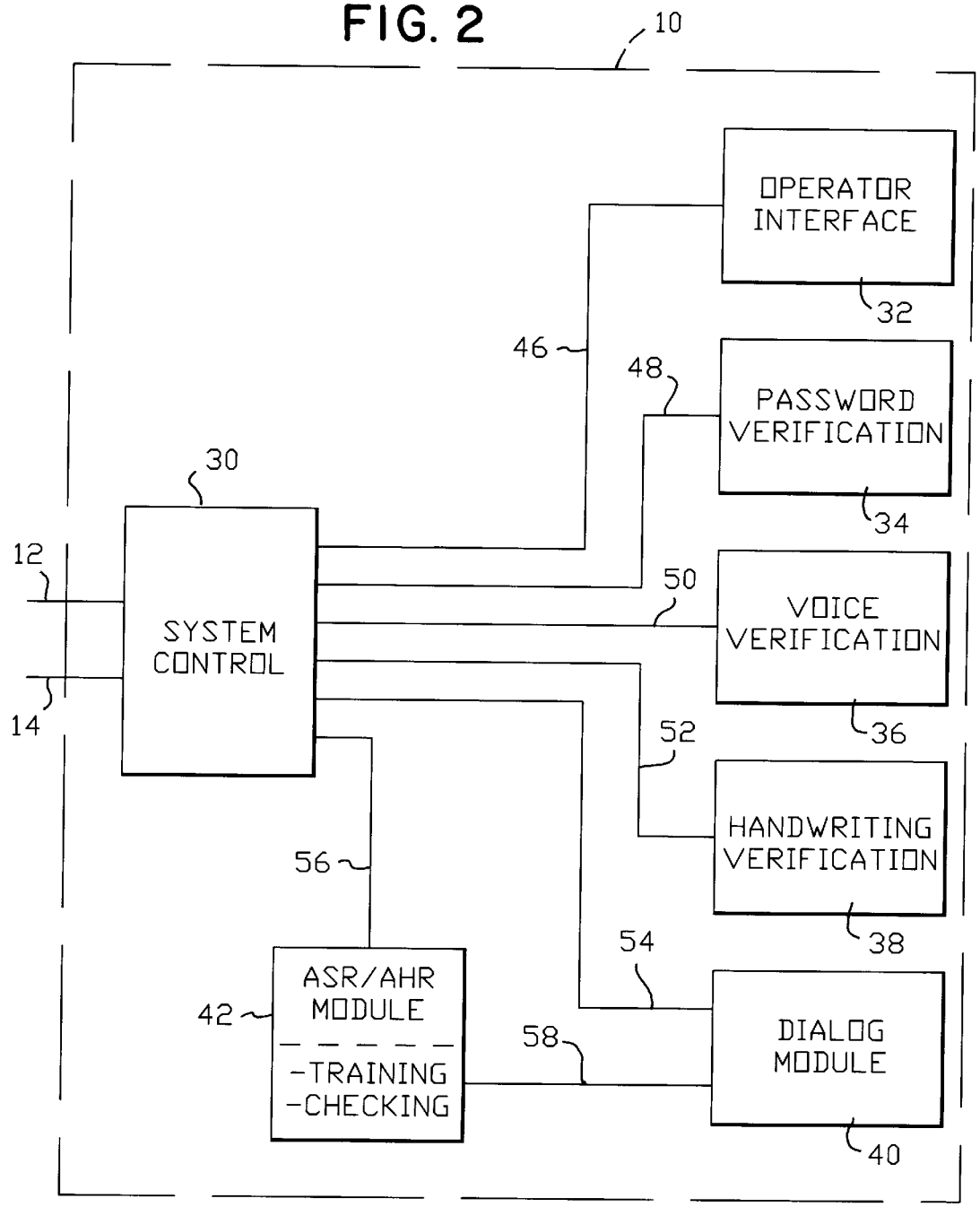
FIG. 2 is a functional block diagram of the authentication system of FIG. 1.

As described above, the authentication system 10 determines the authorization status of the user, i.e. whether an individual is authorized to access the requested service provider network 2. With reference to FIG. 2, the authentication system 10 includes a system control module 30 interfaced to a plurality of subsystems. The system control module 30 manages operation of the subsystems, controls the flow of data between the subsystems and controls the flow of data in and out of the authentication system 10. The subsystems may include an operator interface 32, a password verification system 34, a voice verification system 36, a handwriting verification system 38, a fingerprint verification system (not shown), and other systems that verify predetermined characteristics of authorized users.

The operator interface 32 provides a link to a human operator and/or pre-recorded help system when requested or when encountering a predetermined class of problems. The operator interface 32 communicates with the system control module via communication link 46. The password verification system 34 confirms that the user has input a password and/or personal identification number (PIN). The password verification system 34 communicates with the system control module 30 via communication link 48. The voice verification system 36 compares input data representing the user's spoken voice to predetermined characteristics to confirm a match. The voice verification system 36 communicates with the system control module 30 via communication link 50. The handwriting verification system 38 compares input data representing the user's handwriting to predetermined characteristics to confirm a match. The handwriting verification system 38 communicates with the system control module 30 via communication link 52.

According to the present invention, the authentication system 10 includes a dialog module 40 that generates output data representing questions to be asked of the user, receives and interprets input data representing answers to the questions asked, and assigns a score to the number of questions answered correctly. The questions asked of the user may be related to previous questions and/or to answers to previous questions. To provide the user with the capability of answering the questions generated by the dialog module 40 with speech and/or handwriting, the authentication system 10 may include an automatic speech and handwriting recognition system ASR/AHR system) 42. Input data representing the user's spoken voice and/or handwriting originates from the user input/output device 4 and is communicated to the receiving station 6 and forwarded to the system control module 30. The ASR/AHR system receives the input data over communication link 56, interprets the input data, and generates data corresponding to the interpretation of the input data. The data generated by the ASR/AHR system 42 is output to the dialog module 40 via communication link 58.

The ASR/AHR system 42 may be used in combination with other sub-systems of the authentication system 10. For example, the data generated by the ASR/AHR system 42 may be output to the password verification system 34, thereby allowing the user to input a password and/or PIN verbally or by handwriting.

The ASR/AHR system 42 may require training to effectively interpret the voice and handwriting of the user. Training of the ASR/AHR system 42 is typically accomplished by the authorized user reading/writing a predetermined script. The ASR/AHR system decodes the user's response and stores decoded data for subsequent interpretation. The decoded data may also be imported from other compatible ASR/AHR systems, for example, an ASR/AHR system resident in the user's home computer. The ASR/AHR system 42 might also be trained non-intrusively. In this case, at the beginning of enrollment, the transaction requests of the user are processed by a human operator utilizing the operator interface 32. The ASR/AHR system 42 records the transactions, matches portions of the transactions to predetermined words/phrases, decodes the user's response to the predetermined words/phrases, and stores the decoded data for subsequent interpretation. When sufficient decode data has accumulated, the training of the ASR/AHR system 42 is complete.

In the case that the system control module 30 is remote from one or more of the subsystems of the authentication system 10, or in the case that any two of the subsystems are remote from one another, the corresponding communication links 46,48,50,52,54,56,58 of FIG. 2 may utilize a modem over a telephone network, a direct data link over cable, an RF link, a microwave link or other suitable data communication techniques. In the case that the system control module 30 and one or more of the subsystems of the authentication system are integrated into a common processing system, or in the case that two or more of the subsystems are integrated into a common processing system, the corresponding communication links 46,48,50,52,54,58 of FIG. 2 may be data paths of the processing system.

Figure 3:
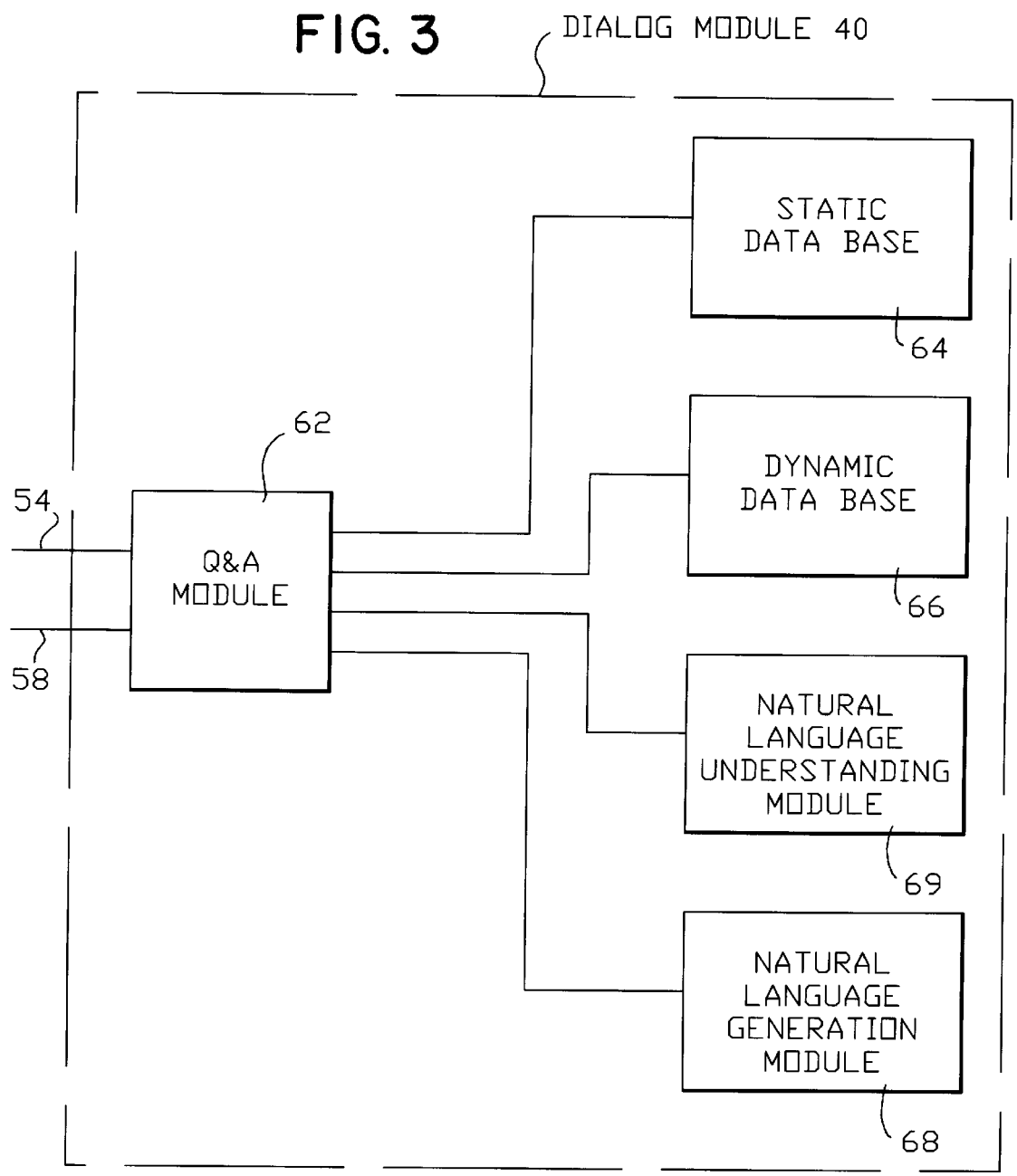
FIG. 3 is a functional block diagram of the dialog module of FIG. 2.

As shown in FIG. 3, the dialog module 40 includes a Q&A module 62 interfaced to a static data base 64 and a dynamic data base 66. The static data base 62 stores static information associated with each authorized user. Static information is defined as information that does not change over time, for example, the user's predetermined identification number, the user's social security number, the user's birthday, or family members of the user. The dynamic data base 64 stores dynamic data information associated with each authorized user. Dynamic information is defined as information that changes over time, for example, balance information of the user's bank account, the history of messages received and/or transmitted in the user's electronic mail box, the history of credit card purchases made by the user, or movies/sporting events watched on a pay per view basis last month, etc.

The Q&A module 62 has two primary functions: dialog management and dialog interpretation. Dialog management includes the function of determining when to generate output data representing questions to be asked of the user and, separately, determining what information is to be included in the output data. Dialog interpretation includes the function of determining if a response to a question is correct and separately, tracking the number of correct responses and/or generating a score according to the number of correct responses.

Questions generated by the Q&A module 62 are communicated to the system control module 30 via communication link 54, forwarded to the receiving station 6, and finally routed to the user input/output device 4 for communication to the user. The questions generated by the Q&A module typically comprise a string of words and/or numbers that may be related to previous questions or related to answers to previous questions. The questions may be generated in a random order to avoid repetition of questions.

The questions generated by the Q&A module 62 incorporate information from the static data base 64 and/or the dynamic data base 66. As shown in FIG. 5, the information contained in the static and/or dynamic data bases 64,66 may be arranged in tabular form as a plurality of entries for each authorized user. Each user is identified by an identification code, which may be an identification number $1, 2, \ldots K$ as shown. Each entry is defined by a set of formal properties $a_{11}, a_{12}, a_{13}, \ldots a_{1n}$ associated with the user. The formal properties represent information items regarding the user. Moreover, the entries may be broken down into categories A, B, C, ... ZZ as shown.

For example, the entries of each user may include a category A related to numerical data associated with the user, a category B related to genealogical data associated with the user, or a category ZZ related to cities associated with the user. Within category A, the formal properties may include a numerical string that identifies the user's birthday and/or a numerical string that identifies the user's social security number. Within category B, the formal properties may be a numerical string that identifies the number of members in the user's family, and/or a character string that identifies the name, gender and relationship of the members of the user's family, and/or a numerical string that identifies the birthday of the members of the user's family. And within category ZZ, the formal properties may include a character string that identifies the city where the user lives, and/or a character string that identifies the city where the user works, and/or a numerical string that identifies the distance between the two cities.

FIG. 5 illustrates a tabular form for storing data in the static and/or dynamic data bases 64,66, however the invention is not limited in this respect. The data bases may be one of a variety of structures, including a relational data base, tree or other data structures known to those skilled in the art.

The Q&A module 62 includes a semantic machine that generates questions according to algorithms that define a relationship between the formal properties of entries. Like the formal properties, the algorithms may be categorized into separate categories A,B ... ZZ as described above. For example, in the first category A related to numerical data, a first algorithm may be whether a first formal property X is larger than a second formal property Y, a second algorithm may be the sum of the first and second formal properties X,Y, etc. And in the second category B related to genealogical data, a first algorithm may whether X and Y have the same father, a second algorithm may be whether X has two brothers, etc.

To generate a question to be asked of the user, the semantic machine first identifies one or more formal properties associated with the user. The semantic machine then selects one or more algorithm(s) associated with the identified formal properties. The particular algorithm(s) may be selected randomly or be part of an ordered list. Moreover, the algorithms may vary in complexity and detail. In this case, the complexity of the algorithm chosen may correspond to the level of security of the system (described below with respect to the system controller 80). The semantic machine then formulates the question by integrating the identified formal properties with the algorithm.

The algorithms discussed above may simply be templates, or in a more advanced applications may include natural language text. In this case, a natural language generation module 68 interfaces to the Q&A module 62 to augment the function of the Q&A module 62 in formulating questions that include natural language text. A more detailed description of methods that may be used by the Q&A module 62 to formulate questions may be found in D. McDonald & L.

Bolc, *Natural Language Generation Systems* (1988), R. Dale, *Generating Referring Expressions—Constructing Descriptions in a Domain of Objects and Processes* (1992), and *Advances in Natural Language Generation*—Volume 1 (M. Zock & G. Sabah ed. 1988), hereinafter incorporated by reference in their entirety. Because the questions asked of the user are based on dynamic data, the system advantageously protects against eavesdroppers gaining access to the service or facility.

Additionally, the Q&A module 62 may store access history data representing that access history of the static information and/or dynamic information by the Q&A module 62. The access history data may be, for example, a bit flag indicating accessed/unaccessed or the time and date of the last access. The access history data is utilized by the Q&A module 62 to generate questions containing unaccessed (or non-recently accessed information, thus ensuring that the same or similar questions are not generated by the Q&A module 62. The access history data may also be utilized to determine when a set of questions about one or more formal properties defines the formal property altogether to ensure that the complete set of questions is not asked of the user to protect against eavesdroppers. For example, assume the Q&A module asked the user first what was the sum of the third and fourth digits of his social security and number, and second asked the user what was the product of the third and fourth digits. The Q&A module 62 should not ask as the third questions whether the third digit is larger than the fourth digit because in this case an eavesdropper would be able to reconstruct the third and fourth digits of the social security number completely.

Moreover, the Q&A module 62 may formulate the questions such that a minimum amount of information contained in the static data base 64 and the dynamic data base 66 is disclosed to the user. This feature is advantageous because it protects against an eavesdropper gaining access to the service provider network 2 and provides the capability of generating a relatively large number of different questions from a small data base. The Q&A module 62 may limit the information disclosed to the user by linking two or more pieces of information together in formulating a question. For example, the Q&A module may generate a question that asks for the sum total (i.e. deposits less withdrawals) of the user's checking account transactions over the last two days. The Q&A module 62 may also limit the information disclosed to the user by formulating questions that ask about the relationship among portions of the information. For example, the Q&A module 62 may generate a question that asks for the sum of the first and last digit of the user's social security number. The Q&A module 62 may also limit the information disclosed to the user by formulating questions that ask about relative attributes between formal properties. For example, the Q&A module 62 may generate a question that asks whether the distance between the city where he and his wife reside and the city where he works is larger than the distance between the city where he and his wife reside and the city where she works. Moreover, the Q&A module 62 may generate questions that pertain to the relative attributes of dynamic properties. For example, the Q&A module 62 may generate a question that asks whether the distance between the city where he resides and the city where he works is larger than the distance between the city where he resides and the city where he bought a new VCR last week.

The Q&A module 62 also functions to interpret data representing answers to the questions asked, and records the number of questions answered correctly. The data representing answers to questions asked is generated by the user input/output device 4, forwarded to the receiving station 6, and routed to the system control module 30. The data may be communicated directly from the system control module 30 to the Q&A module 62 via communication link 54, or forwarded to the ASR/AHR system 42 for processing and received from the ASR/AHR system 42 via communication link 58.

The Q&A module may utilize a variety of techniques to interpret the responses to the questions asked of the user. The techniques vary in scope and methodology. Regarding scope, the technique may be restricted to the interpretation of certain words or word patterns, or the technique may attempt to process whole sentences of text. In speech understanding, the techniques emphasize parsing spoken words into sentences and processing the sentences. These techniques rely on identifying the structure of a sentence, and then determining the meaning of the sentence according to the identified structure. Techniques for interpreting word(s) and sentences are discussed in greater detail in G. Gazdar & C. Mellish, *Natural Language Processing in PROLOG— An Introduction to Computational Linguistics* (1989), and P. Jacobs & L. Rau, *Innovation in text interpretation*, Artificial Intelligence 63, pp. 143–191 (1993), hereinafter incorporated by reference in their entirety. To interpret dialog, many techniques are available as discussed in W. Zadrozny et al., *NL Understanding with a grammar of constructions*, Proceedings of the International Conference on Computational Linguistics, August 1994, and Dowding et al., *Gemini: A Natural Language System for Spoken-Language Understanding*, Proceedings of the 31st Annual Meeting of the Association for Computational Linguistics, pp. 54–61, June 1993, hereinafter incorporated by reference in their entirety.

The Q&A module 62 may be interfaced to a natural understanding module 68 that augments the function of the Q&A module 62 in interpreting the data representing answers to questions asked of the user. Specifically, the natural understanding module 68 identifies words and phrases that have the same meaning. For example, the natural understanding module may determine that "March 4" and "the 4th of March" have the same meaning. A more detailed description of techniques that may be utilized by the natural language understanding module 68 may be found in Grau et al., *Control in Man-Machine Dialogue*, THINK, pp. 32–55, May 1994, and G. Hirst, *Semantic interpretation and the resolution of ambiguity* (1987), herein incorporated by reference in their entirety.

Figure 4:
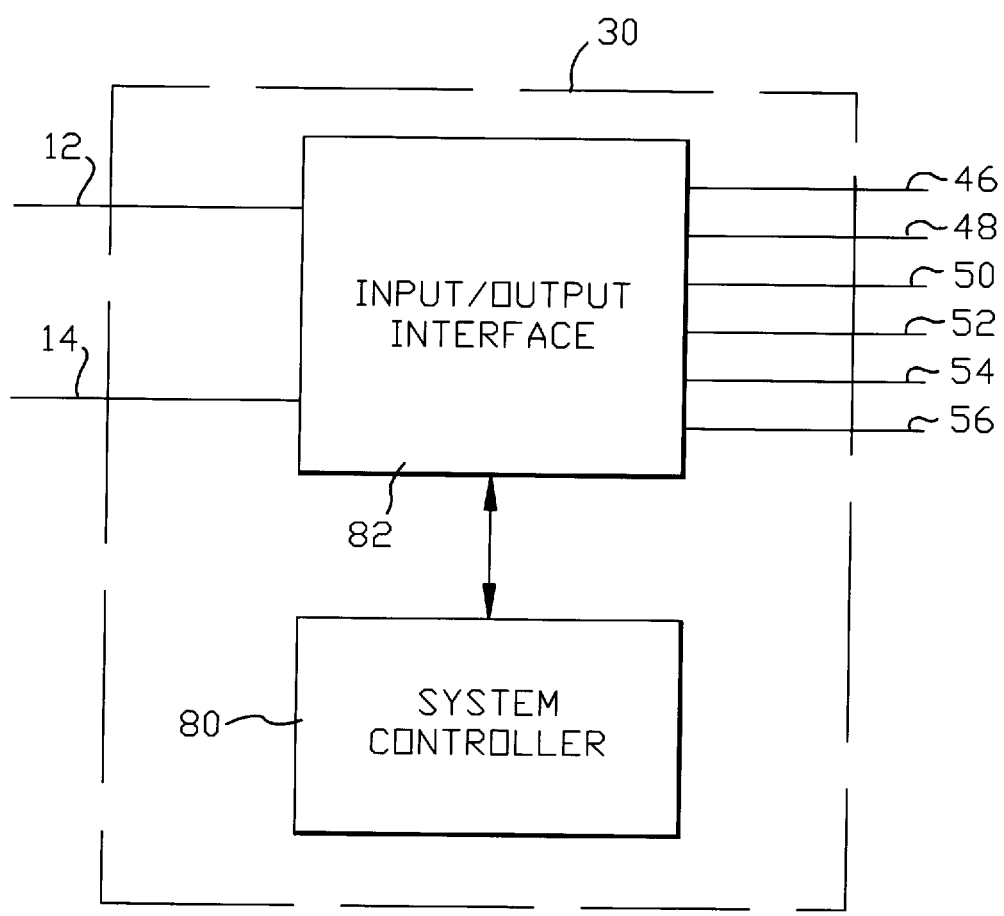
FIG. 4 is a functional block diagram of the system control module of FIG. 2.

As shown in FIG. 4, the system control module 30 includes a system controller 80 coupled to an input/output interface 82 that operate cooperatively to control the flow of data in and out of the authentication system 10 and to control the flow of data between the subsystems of the authentication system 10. The system controller 80 also functions to determine the authorization status of the user. For example, the sub-systems of the authentication system 10, i.e. the password verification system 34, the voice verification system 36, the handwriting verification system 38 and the dialog module 40, may generate result data representing a confidence level that the user requesting access is in fact an authorized user and should be granted access to the requested service provider network 2. In particular, the result data generated by the dialog module 40 may be a data value that is based upon the correct number of questions answered by the user stored by the dialog module 40. The system controller 80 receives the result data generated by the sub-systems of the authentication system 10 via input/output interface 82, determines the authorization status of the user according to result data, and outputs the determined authorization status to the appropriate service provider network 2 via input/output interface 82. The determination of the authorization status by the system controller 80 may be made, for example, according to a weighted function of the confidence levels represented by the result data.

Moreover, the system controller 80 may control the level of security of the identification process for each of the sub-systems of the authentication system 10. One technique to control the level of security is to vary the type or complexity of the question(s) asked of the user as well as the number of questions asked according to the security level. For example, if the result data generated by the voice verification system 36 represents a high confidence level, then the system controller may control the dialog module 40 to operate at a relatively low security level and thereby ask the user a small number of simple questions. In another example, if a transaction requested by the user warrants a high level of security (for instance, the user requests access to sensitive confidential data), the system control may control the dialog module 40 to operate at a relatively high security level and thereby ask the user a large number of complex questions. In addition, the security level may be controlled by the service provider network 2.

Furthermore, the security level of the system may be based on the probability of guessing the correct answer to the question(s) asked of the user. For example, consider three questions that may be asked of the user. The first question asks for the sum of two digits. The second question asks if the relative distance between two cities is greater than the relative distance between another two cities. And the third question is the combination of the first and second questions. The probability of correctly guessing the first question is 1 in 19. The probability of correctly guessing the second questions is 1 in 2. And the probability of correctly guessing the third question is 1 in 38. Thus, in this case, the second question corresponds to a relatively low security level, the first question corresponds to a higher security level, and the third question corresponds to an even higher security level.

The system of FIGS. 1–5 may be utilized to control access to a variety of service provider networks, such as financial institutions providing bank and/or credit accounts, telephone providers, computer systems, data base systems, home video providers including pay per view and video on demand providers, interactive television providers, and retailers that sell merchandise by phone and/or television.

In a concrete example, the system of FIGS. 1–5 may be utilized to provide ATM access to a bank and/or credit account provided by a financial institution. In this case, the user input/output device 4 of FIG. 1 is an ATM banking machine and the service provider network 2 is a computer data base system that stores relevant account information and user identification information if needed. A user typically initiates ATM access to the user's bank and/or credit account by inserting a card into a magnetic card reader of the ATM banking machine. The magnetic card reader scans the card to read account data identifying the user's account. In the alternative, access may be initiated by voice commands input by the user. In this case, the ATM banking machine may be controlled to request that the user provide his/her account number verbally. The user is then requested to specify a transaction using a keypad of the ATM banking machine or by voice commands. The transaction may be, for example, a withdrawal of $500 from the user's savings account. The ATM banking machine then generates transaction data that defines the transaction requested by the user. The transaction data and account data are then transmitted from the ATM banking machine to the receiving station 6 via communication link 8.

The system then may operate in one of two modes. In the first mode, the transaction data is stored during the verification process. Only after the authentication system 10 has confirmed that the user is an authorized user, the transaction data and account data is forwarded to the service provider network 2. In the second mode, the transaction and account is forwarded to the service provider network 2 prior to completion of the verification process. In this case, the service provider network may begin processing the transaction during verification, and only complete the transaction after having received confirmation from the authentication system 10 that the user is an authorized user.

In each of the two modes, the authentication system 10 verifies the authorization status of the user requesting access to the bank account. The verification process of the authentication system 10 may be initiated by the receiving station 6 transferring to the authentication system 10 via communication link 12 a start authentication command and the transaction and account data generated by the ATM banking machine. The system control 30 of the authentication system 10 may begin the verification process by activating the password verification and voice verification sub-modules 34,36, respectively. If the user enters the correct password during password verification and the user's voice is determined to precisely match stored voice characteristics during voice verification, the system control 30 may bypass questioning by the dialog module 40.

However, if the user enters the correct password during password verification, yet it is determined that the match between the user's voice and the stored voice characteristics does not meet a requisite confidence level, system control 40 may activate the dialog module 40 to begin questioning of the user. In this case, questions generated by the dialog module 40 may be derived from data stored in the static data base 64. For example, the dialog module 40 may ask the user to enter his/her birth date. The questions generated by the dialog module 40 may also be derived from data stored in the dynamic data base 66. For example, the dialog module 40 may ask the user the date of his last transaction or the amount of his last charge to his VISA credit account. Moreover, the dialog module 40 may formulate the questions such that a minimum amount of information contained in the static data base 64 and the dynamic data base 66 is disclosed to the user as described above.

The answers to the questions asked of the user are received and processed by the Q&A module 62. The Q&A module may generate result data representing a confidence level that the user requesting access is in fact an authorized user and should be granted access to the requested service provider network 2. In particular, the result data generated by the Q&A module 62 may be a data value that is based upon the correct number of questions answered by the user stored by the Q&A module 62.

The system controller 80 of the system control 30 receives the result data generated by the Q&A module via input/output interface 82, determines the authorization status of the user according to result data, and outputs the determined authorization status to the appropriate service provider network 2 via input/output interface 82.

If authentication is successfully completed, the Q&A module 62 may generate a new question related to a new property not currently stored in the dynamic data base 66. In this case, the answer to the question is interpreted and stored in the dynamic data base as a formal property for subsequent authentications.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. An apparatus for controlling access to a service or facility according to answers provided by a user in response to questions asked of the user, said apparatus comprising:

a data base storing information;

a first module that generates at least one question based upon said information stored in said data base, wherein said at least one question concerns an arithmetic relationship among portions of information contained in said data base, and wherein said at least one question does not explicitly disclose said portions of information contained in said database; and means for communicating to the user said at least one question generated by said first module.

2. The apparatus of claim 1, further comprising:

means for receiving a response associated with said at least one question, wherein said response is generated by the user; and a second module that interprets said response to determine whether said response conforms to said information upon which is based the associated at least one question.

3. The apparatus of claim 2, further comprising a system control module that outputs an authorization status indicating whether or not the user is authorized for access according to the determination made by said second module.

4. The apparatus of claim 1, wherein said first module generates a number of questions to be asked of the user, wherein said number corresponds to a security level of said apparatus.

5. The apparatus of claim 1, wherein said first module generates a plurality of questions each having an associated security level, wherein cumulative security level of said plurality of questions corresponds to a security level of said apparatus.

6. The apparatus of claim 2, wherein said response is spoken voice and said second module further comprises a speech recognition module for processing said response.

7. The apparatus of claim 2, wherein said response is handwriting and said second module further comprises a handwriting recognition module for processing said response.

8. The apparatus of claim 3, wherein upon receiving said authorization status indicating the user is authorized for access, said first module generates at least one new question, and said second module updates said data base according to a response associated with said at least one new question.

9. The apparatus of claim 1, wherein said information stored in said data base includes static and dynamic information.

10. A method for controlling access to a service or facility according to answers provided by a user in response to questions asked of the user, the method comprising the steps of:

controlling a first module to generate at least one question based upon data stored in a data base, wherein said at least one question concerns an arithmetic relationship among portions of information contained in said data base, and wherein said at least one question does not explicitly disclose said portions of information contained in said database;

communicating to the user said at least one question;

receiving a response associated with said at least one question, wherein said response is generated by the user;

controlling a second module to interpret said response to determine whether said response conforms to said data upon which is based the associated at least one question; and outputting an authorization status indicating whether or not the user is authorized for access according to the determination made by said second module.

11. The method of claim 10, wherein said first module generates a plurality of questions each having an associated security level, wherein cumulative security level of said plurality of questions corresponds to a system security level.

12. The method of claim 10, wherein said response is spoken voice and said second module further comprises a speech recognition module for processing said response.

13. The method of claim 10, wherein said response is handwriting and said second module further comprises a handwriting recognition module for processing said response.

14. The method of claim 10, further comprising the steps of:

upon receiving said authorization status indicating the user is authorized for access, controlling said first module to generate at least one new question, and controlling said second module to update said data base according to a response associated with said at least one new question.

15. The method of claim 10, wherein said information stored in said data base includes static and dynamic information.

16. The method of claim 10, wherein said first module generates a number of questions to be asked of the user, wherein said number corresponds to a security level.

* * * * *